(12) United States Patent
Romig

(10) Patent No.: US 7,617,890 B2
(45) Date of Patent: Nov. 17, 2009

(54) STEERING MECHANISM FOR SELF-PROPELLED MOWER

(75) Inventor: Bernard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 232 days.

(21) Appl. No.: 11/429,874

(22) Filed: May 8, 2006

(65) Prior Publication Data

US 2007/0256868 A1  Nov. 8, 2007

(51) Int. Cl.
*B62D 11/00* (2006.01)

(52) U.S. Cl. .................. 180/6.48; 180/65.5; 180/12; 180/411; 56/6

(58) Field of Classification Search ............. 180/6.48, 180/6.2, 6.3, 12, 13
See application file for complete search history.

(56) References Cited

U.S. PATENT DOCUMENTS

| | | | | |
|---|---|---|---|---|
| 4,262,783 A * | 4/1981 | Scarrott et al. | ............... | 477/94 |
| 4,289,214 A | 9/1981 | Spence | ............... | 180/234 |
| 4,718,508 A * | 1/1988 | Tervola | ............... | 180/6.44 |
| 4,913,669 A * | 4/1990 | Young | ............... | 440/14 |
| 4,976,671 A * | 12/1990 | Andersson | ............... | 475/299 |
| 5,450,320 A | 9/1995 | Tsubaki et al. | ............... | 364/424.02 |
| 5,623,818 A | 4/1997 | Ledbetter | ............... | 56/15.4 |
| 5,667,032 A | 9/1997 | Kamlukin | ............... | 180/256 |
| 5,679,087 A * | 10/1997 | Lutz | ............... | 475/149 |
| 5,685,798 A * | 11/1997 | Lutz et al. | ............... | 475/331 |
| 5,915,493 A * | 6/1999 | Nakayama | ............... | 180/206 |
| 5,916,285 A | 6/1999 | Alofs et al. | ............... | 701/23 |
| 6,017,289 A * | 1/2000 | Gaffney | ............... | 475/346 |
| 6,145,611 A * | 11/2000 | Haddad, Sr. | ............... | 180/12 |
| 6,185,920 B1* | 2/2001 | Oxley | ............... | 56/14.7 |
| 6,991,059 B2* | 1/2006 | Stubbe | ............... | 180/253 |
| 7,024,842 B2* | 4/2006 | Hunt et al. | ............... | 56/6 |
| 7,024,843 B2* | 4/2006 | Hunt et al. | ............... | 56/6 |
| 7,047,712 B1* | 5/2006 | Hunt et al. | ............... | 56/6 |
| 7,059,433 B2* | 6/2006 | Hasegawa et al. | ............... | 180/6.2 |
| 2005/0108998 A1* | 5/2005 | Hunt et al. | ............... | 56/6 |
| 2006/0090438 A1* | 5/2006 | Hunt et al. | ............... | 56/10.2 A |
| 2007/0080000 A1* | 4/2007 | Tobey et al. | ............... | 180/21 |
| 2007/0204581 A1* | 9/2007 | Reimers et al. | ............... | 56/7 |
| 2007/0295542 A1* | 12/2007 | Raue | ............... | 180/6.38 |

* cited by examiner

*Primary Examiner*—Lesley D Morris
*Assistant Examiner*—Tashiana Adams

(57) ABSTRACT

A steering mechanism for a wheel of a self-propelled vehicle includes a wheel spindle on which the wheel is rotatably mounted, a steering motor turning a steering tube defining a generally vertical steer axis, a propulsion drive motor turning a propulsion drive shaft extending through the steering tube, and a plurality of gears providing a gear reduction ratio between the propulsion drive motor and the wheel. The wheel is offset from the steer axis and rotates on the wheel spindle if the steering motor turns the steering tube while the propulsion drive shaft is stationary.

19 Claims, 6 Drawing Sheets

STEERING MECHANISM FOR SELF-PROPELLED MOWER

TECHNICAL FIELD OF THE INVENTION

The invention relates to self-propelled vehicles, and particularly to steering mechanisms for self-propelled mowers.

BACKGROUND OF THE INVENTION

Examples of self-propelled mowers are shown in U.S. Pat. Nos. 7,024,842 and 7,024,843 assigned to Deere & Company of Moline, Ill. The self-propelled mower frame supports wheel assemblies, a propulsion unit, and one or more mowing decks. Each wheel assembly may be associated with a corresponding wheel, electrical steering motor, and electrical drive motor. A controller controls a steering direction of orientation of the corresponding wheel via application of electrical energy to the corresponding drive motor consistent with maneuverable movement of the mower. The propulsion unit is capable of rotating at least one cutting blade housed under a mower deck. Self-propelled mowers may be riderless, or may provide an operator station on the vehicle platform.

Each wheel assembly may include a spindle assembly that is affixed to the frame or operably attached to the frame via a suspension component. The spindle assembly may provide a housing for bearings that receive a shaft. One end of the shaft may be associated with a yoke and the opposite end of the shaft may be associated with a steering assembly. The yoke may provide a mounting for a drive motor, a tire, and a drive encoder. The steering assembly may include a steering motor, a steering encoder, and a steering gearbox. The steering gearbox may provide gear reduction such that a lower torque motor (e.g., a lightweight durable motor) may be used as the steering motor. The steering motor may allow the shaft and yoke to pivot freely from zero to 360 degrees when no power or a certain control signal is applied to the steering motor. In an alternate embodiment, the steering gearbox may permit the steering motor to be disengaged from turning or changing the orientation of the wheel by a clutch, a gear mechanism or another mechanical or electromechanical structure.

When drive motors of wheels on a self-propelled vehicle such as a mower are at rest, operating the steering motors to steer the mower wheels in place may scuff the ground surface. Scuffing is a problem in areas where high quality mowing is important, including athletic fields. It is desirable to reduce or eliminate scuffing when steering while the mower wheels are not rotated by the drive motor.

Steering a self-propelled vehicle with the mower wheels in place also may require high steering torque. This requires higher torque motors and other components, and may be detrimental to the durability and performance of a self-propelled vehicle. It is desirable to reduce the required torque for steering a self-propelled vehicle when the drive motor for the wheel or wheels is at rest.

Steering a self-propelled vehicle with the mower wheels in place also may have a tendency to move the mower. It is desirable to keep the mower in a stationary position when steering the mower with the wheels in place.

In general, wheel assemblies on self-propelled vehicles such as mowers should be able to rotate continuously about a steer axis. This requires transmitting the power to drive the wheel across the steering joint. for example, electric power for a propulsion motor must be transmitted from the vehicle frame down a tube or shaft and across the steering joint to a motor positioned on or adjacent the wheel hub. To transmit drive or traction power across the steering joint, slip rings, such as mercury wetted slip rings, may be required. For example, U.S. Pat. No. 5,450,320 relates to slip rings used to transmit power for the drive system in an automated guided vehicle. Slip rings may be expensive and may raise environmental concerns. It is desirable to eliminate the use of slip rings for steering self-propelled vehicles, and use less costly and more environmentally friendly alternative.

SUMMARY OF THE INVENTION

A steering mechanism for a self-propelled mower includes steered wheels that are offset from the steer axis. Each steered wheel can roll around its steer axis when the steering mechanism is activated. Propulsion drive for each wheel may be provided mechanically through a vertical drive shaft concentric with the steering axis. The gear ratio between the vertical drive shaft and the axle may be numerically equal or approximately numerically equal to the ratio of the rolling radius of the tire to the scrub radius. This causes the pull generated by the wheel to apply a counterclockwise torque to the steering joint when the propulsion drive shaft rotates in a clockwise direction.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
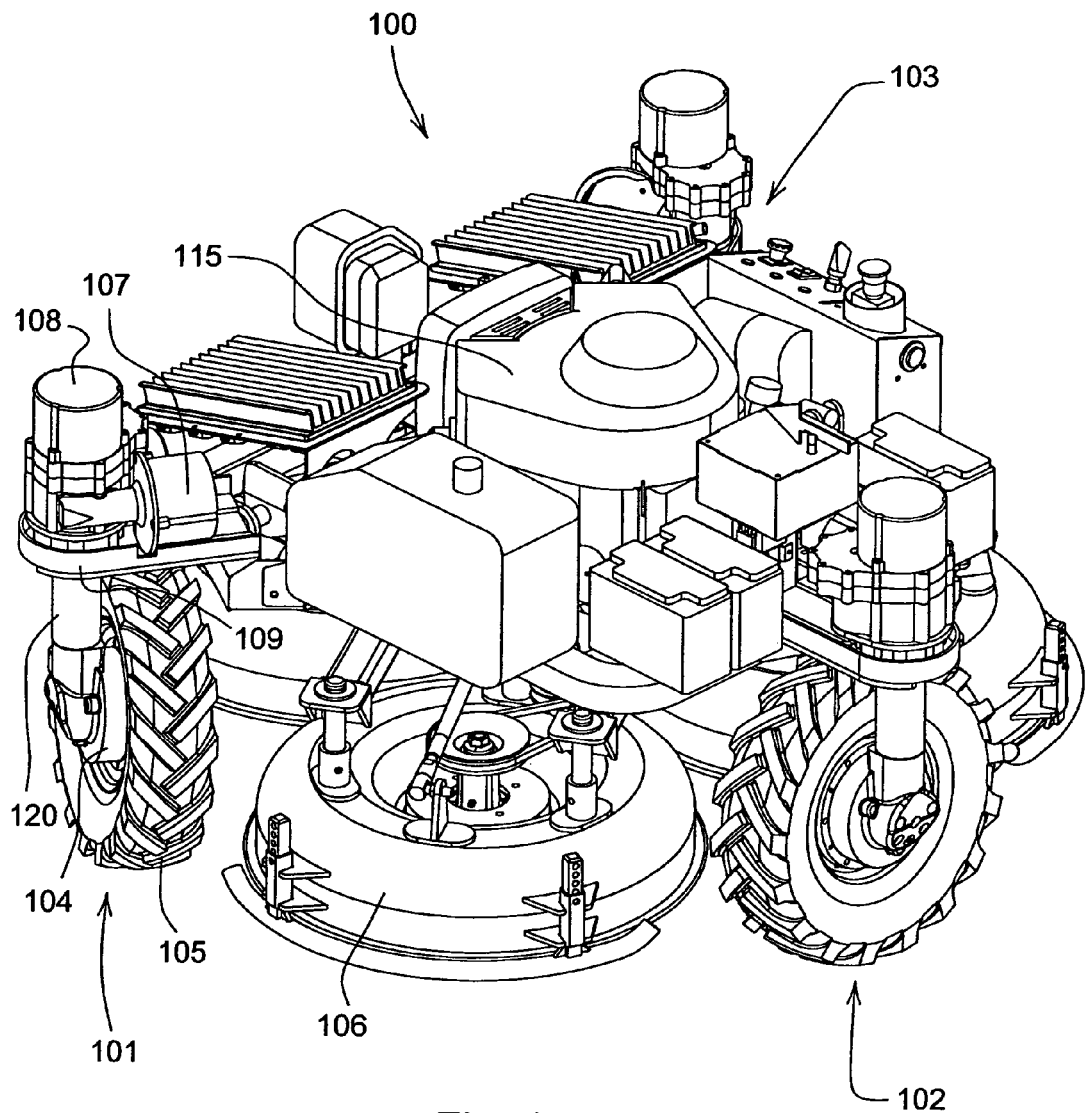
FIG. 1 is a perspective view of a self-propelled mower having a steering mechanism according to one embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

In one embodiment of the invention shown in FIG. 1, self-propelled mower 100 may include a plurality of traction wheels 101-03, a propulsion unit or engine 115, and at least one cutting deck 106 housing a blade for mowing grass. A tire 105 may be mounted on each wheel. The mower frame may be generally triangular and each wheel assembly may be positioned at or near the apex of sides of the triangle formed by the frame, although other shapes of the frame are possible and fall within the scope of the invention. Each wheel assembly may be positioned approximately equidistant on a radius about a center point of the mower, as viewed from the top. A controller may control a steering motor and drive motor for each wheel. The controller may be operated with an operator input device or a mission control computer. Examples of control systems for operating self-propelled vehicles are shown in U.S. Pat. Nos. 7,024,842 and 7,024,843. In the embodiment of FIG. 1, the self-propelled vehicle is riderless, but the invention also may be used on a self-propelled vehicle that carries an operator station for an operator.

Figure 2:
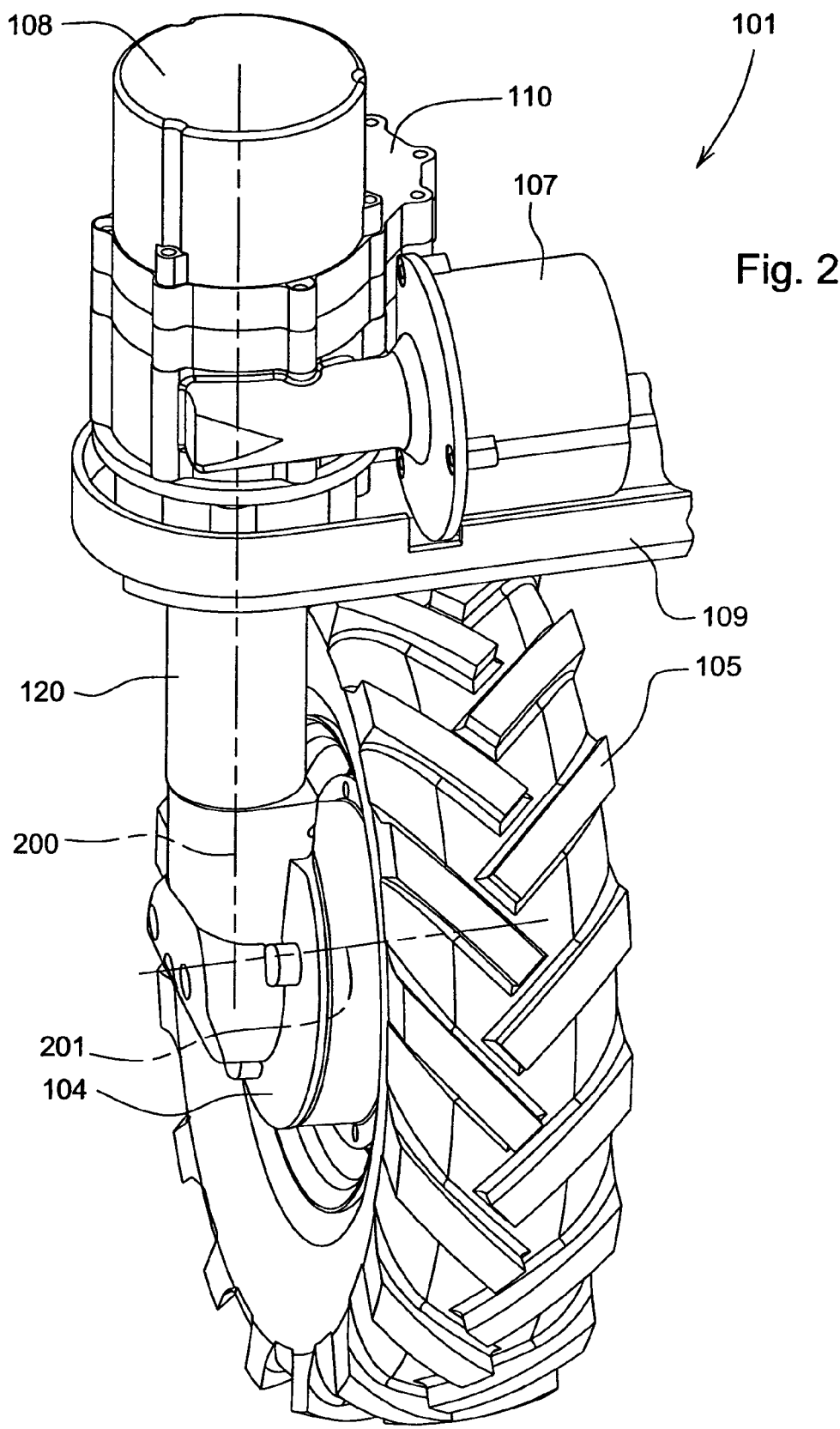
FIG. 2 is a side perspective view of a wheel assembly having a steering mechanism according to one embodiment of the invention.

In one embodiment shown in FIG. 2, each wheel assembly may include a steering mechanism having a steering motor 107 and a propulsion drive motor 108. Preferably, the steering motor and propulsion drive motor are both electric motors. Additionally, the steering motor and propulsion drive motor both may be positioned above wheel hub 104, and most preferably positioned above the outer diameter of tire 105. In one embodiment, gearbox 110 may provide suitable gear reduction between the drive motor and a propulsion drive shaft rotatably mounted within generally vertical support tube 120. Bracket 109 may mount the wheel assembly to the frame of the self-propelled mower.

Figure 3:
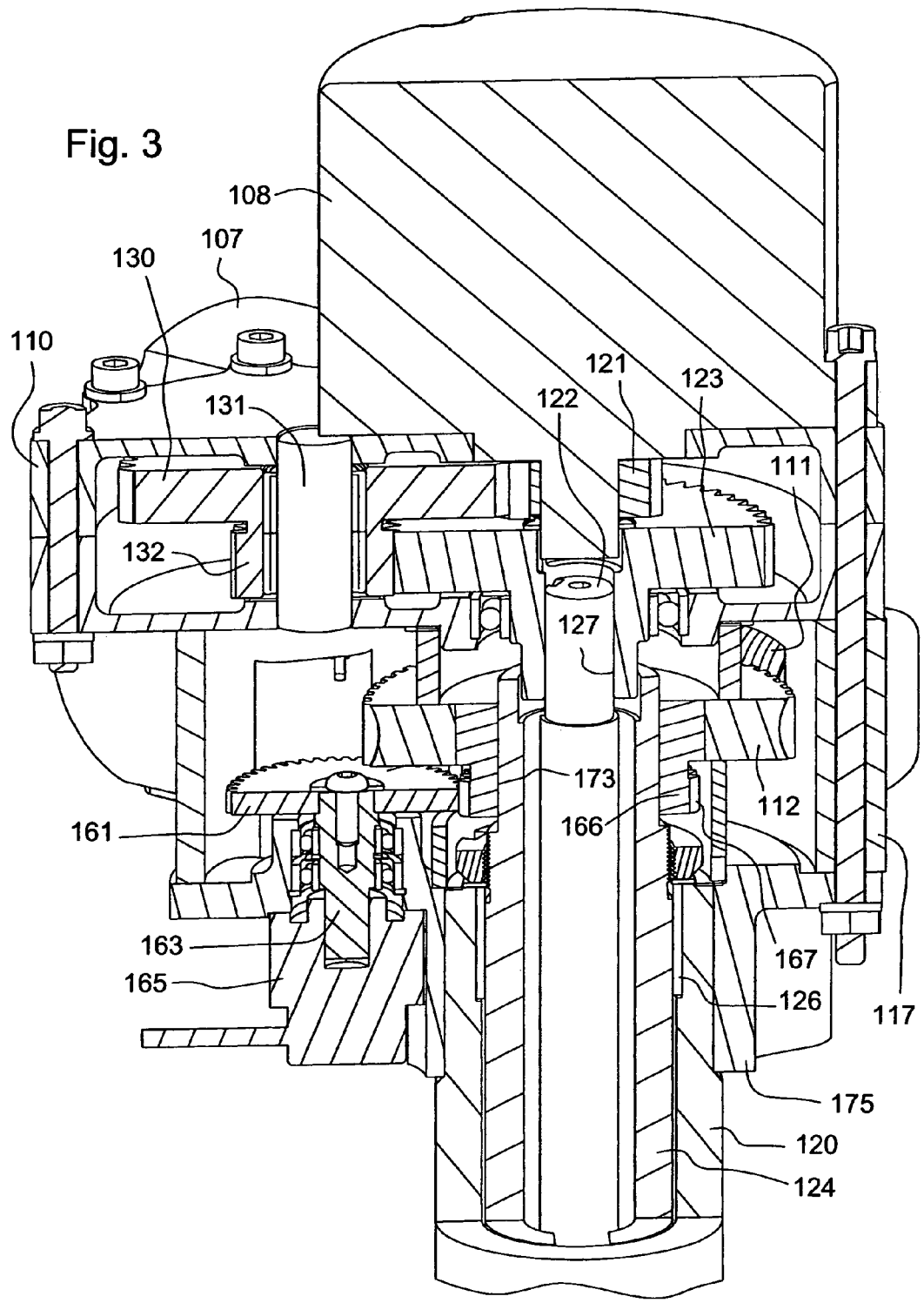
FIG. 3 is a cross section view of the upper portion of a steering mechanism according to one embodiment of the invention.

FIG. 3 is a cross section view of gearbox 110 and housing 117 at the upper end of wheel assembly 101 according to one embodiment of the invention. Propulsion drive motor 108 turns pinion 121 which engages cluster gear 130 on shaft 131. Pinion 132 also may be mounted on shaft 131 and engages propulsion drive gear 123. Propulsion drive shaft 122 may be attached to or mounted inside bore 127 extending from propulsion drive gear 123 through steering tube 124.

In one embodiment, steering motor 107 turns worm gear 111. Worm gear 111 engages steering worm wheel 112. Steering worm wheel 112 may be mounted on steering hub 166, which includes bore 173 into which steering tube 124 is mounted. Bearings 126, 128 may be provided between steering tube 124 and support tube 120.

In one embodiment, information concerning the steering position of wheel 101 may be provided to a controller. For example, steering hub gear 167 may be mounted on steering hub 166, and may engage encoder drive gear 161. Encoder drive gear may be mounted on encoder shaft 163 which provides actual steering position to steering position encoder 165 which may be electrically connected to a controller.

Figure 4:
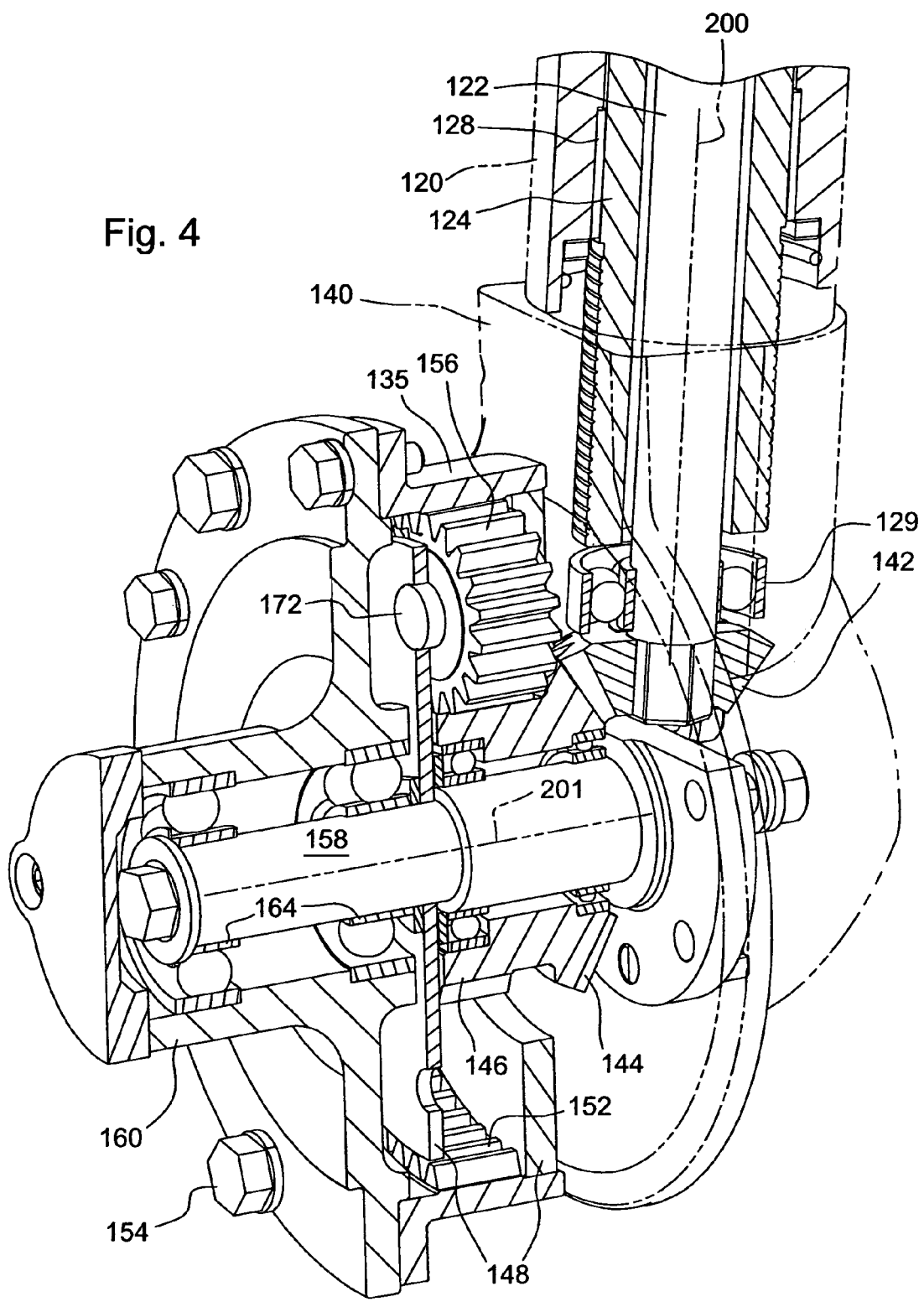
FIG. 4 is a cross section view of the lower portion of a steering mechanism according to one embodiment of the invention.

FIG. 4 provides a cross section view of a lower end of wheel assembly 101 according to one embodiment of the invention. At the lower end of the wheel assembly, bearing 129 may be provided between propulsion drive shaft 122 and housing 140. Bevel pinion 142 may be mounted on the lower end of the propulsion drive shaft. Bevel pinion 142 may engage bevel gear 144 mounted on spindle 158. Sun gear 146 may be integral with bevel gear 144, and may engage three planet gears 156 rotatably mounted on planet gear shafts 172. Planet gears 156 may engage ring gear 152 which is integral to the interior of ring 135. Rotation of propulsion drive shaft 122 turns sun gear 146, engaging planet gears 156 which turn ring gear 152. Ring 135 may be mounted to hub 160, and a wheel may be attached to the hub with bolts 154. Wheel bearings 164 may be provided between spindle 158 and hub 160.

In one embodiment, steering tube 124 may be threaded to housing 140. Planet gears 156 are mounted in planet carrier 148. If steering tube 124 is turned, housing 140 rotates on the same generally vertical axis. If steering tube 124 is turned while propulsion drive shaft 122 is held stationary, the wheel may roll around the steer axis. As the wheel rolls around the steer axis, the ring gear, planet gears, sun gear, and bevel ring gear turn. The bevel ring gear may walk around the bevel pinion which remains stationary with the drive shaft.

Figure 5:
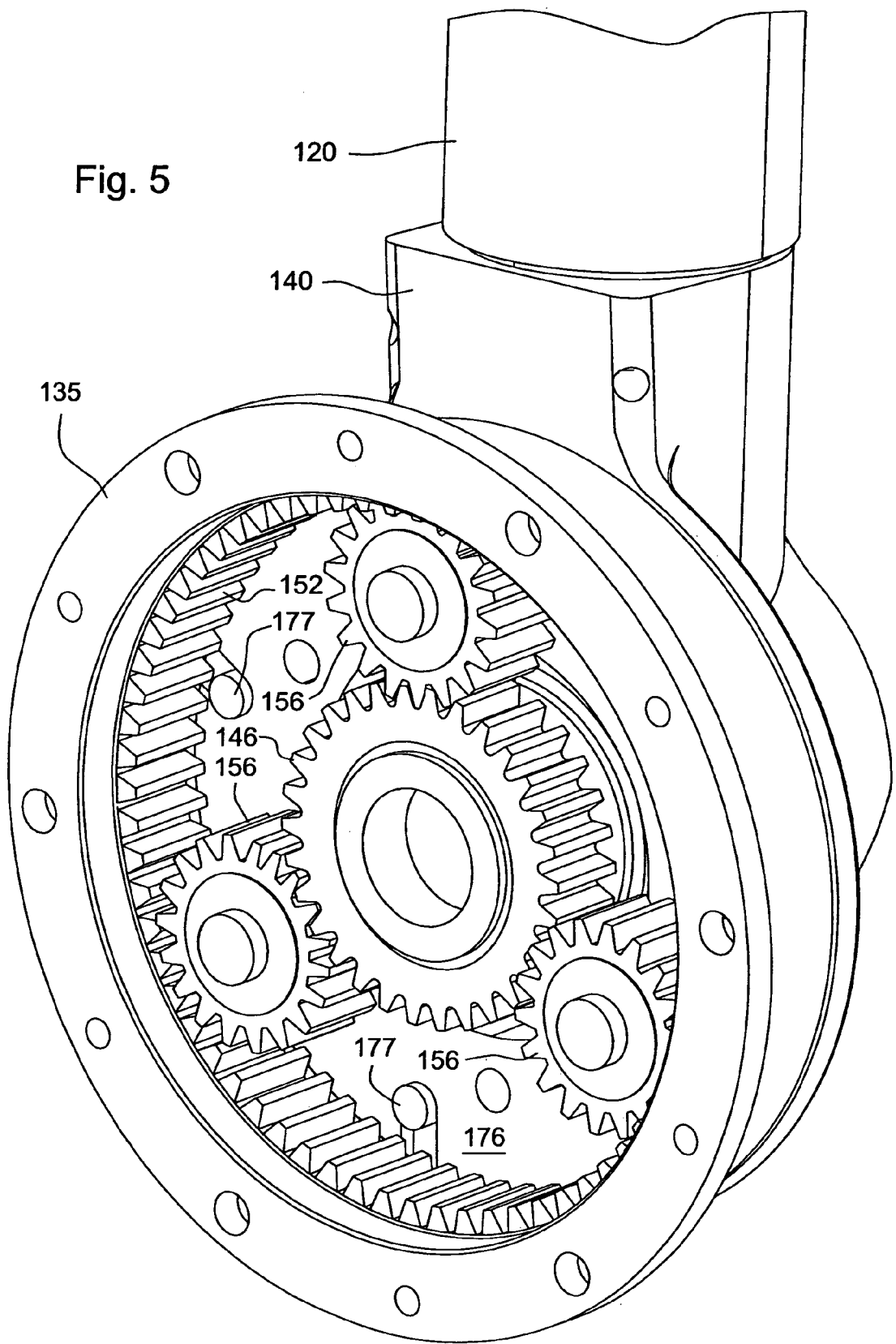
FIG. 5 is a side view of the gears in the lower portion of the steering mechanism of FIG. 4.

In one embodiment, planet carrier 148 may be held stationary with respect to housing 140 at the lower end of the wheel assembly. Locking members 177 shown in FIG. 5 may extend through notches in the outer periphery of planet carrier so that the planet carrier cannot rotate. Each wheel may be allowed to rotate freely, however, by removing or retracting the locking members sufficiently so that planet carrier 148 can turn.

In one embodiment, the gear ratio between the vertical drive shaft and axle is numerically equal to or approximately numerically equal (i.e., within about 10%) to the ratio of the rolling radius to the desired scrub radius of each wheel assembly. For example, in one embodiment, the measured rolling radius of tire 105 is 206.25 mm, and the desired scrub radius (measured from the axis of rotation to the wheel) is 60 mm, so the ratio of the rolling radius to desired scrub radius is (206.25 mm/60 mm)=3.4375.

In one embodiment, the gear reduction between the vertical drive shaft and axle may provide a gear ratio that is numerically equal to or approximately numerically equal to the ratio of rolling radius of tire 105 to a desired scrub radius. Additionally, the gear ratio may be configured to provide adequate clearance between the sidewall of tire 105 and steering support tube 120. For example, gears between the vertical drive shaft and axle may be configured as follows:

Bevel pinion 142: 21 teeth
Bevel gear 144: 34 teeth
Sun gear 146: 30 teeth
Ring gear 152: 66 teeth Based on the gears listed above, the numerical gear ratio between the vertical drive shaft and axle=(34/21)(66/30)=3.5619. In this example, the numerical gear ratio of 3.5619 is within 10% of the ratio of rolling radius to desired scrub radius of 3.4375.

Figure 6:
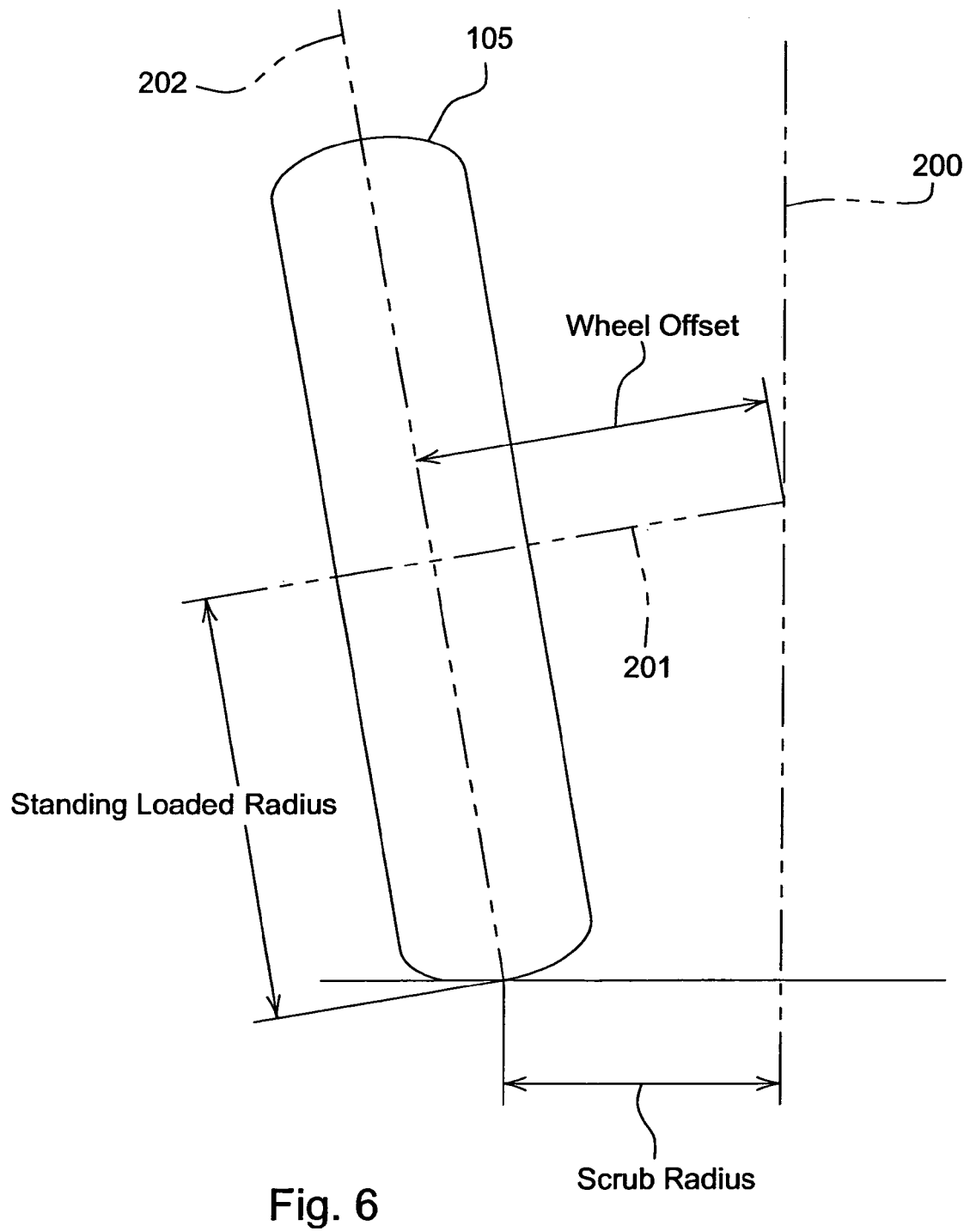
FIG. 6 is a schematic drawing showing the wheel offset of the steering mechanism based on the steer axis and spindle axis according to one embodiment of the invention.

FIG. 6 provides a schematic representation of the wheel offset which may be based on the relationship between steer axis 200 and spindle axis 201. In one embodiment, the wheel offset (measured from the center plane 202 of the wheel to the intersection of the spindle axis and steer axis, parallel to the spindle axis)=76 mm. The scrub radius and standing loaded radius also are shown.

Thus, in one embodiment, a steering mechanism is provided for each wheel on a self-propelled vehicle in which the gear ratio is equal to or approximately equal to the ratio of the rolling radius to scrub radius. This causes the pull generated by the wheel to apply a counterclockwise torque to the steering joint when the drive shaft rotates in a clockwise direction. This allows the wheel to roll around the steer axis when the unit is steered while the drive shaft is held stationary. Additionally, this synchronization limits the torque which must be resisted by the steering mechanism to the product of the rolling resistance and the scrub radius.

Optionally, in one embodiment, the wheel may be cambered to reduce some of the clearances for the steering components.

The steering mechanism of the present invention provides a number of advantages to simplify operation and improve cost effectiveness of self-propelled vehicles. For example, with the present invention, each wheel on a self-propelled vehicle may be turned while the steering support tube remains stationary. With the present invention, a mechanical drive carries power across the steering joint of a wheel on the self-propelled vehicle, instead of slip rings used with electric or hydraulic drives. The present invention also provides a steering mechanism that can reduce or eliminate scuffing, promoting operation of self-propelled vehicles over fragile surfaces such as golf courses without limiting maneuverability. Further, the present invention eliminates steering induced movement of a self-propelled vehicle, and simplifies maneuverability of such a vehicle in confined areas.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A steering mechanism for a wheel of a self-propelled vehicle comprising:
   an electric propulsion drive motor and an electric steering motor mounted above a wheel;
   a gearbox providing gear reduction between the propulsion drive motor and a propulsion drive shaft rotatably mounted within a support tube alongside the gearbox; and
   a steering tube between the support tube and the drive shaft extending downwardly from the steering motor and defining a generally vertical steer axis; the wheel being offset from the steer axis to define a scrub radius; the wheel rolling in the same direction without skidding as the electric steering motor turns the steering tube while the electric propulsion drive motor holds the propulsion drive shaft stationary.

2. The steering mechanism of claim 1 wherein the propulsion drive shaft is concentric with the steering tube.

3. The steering mechanism of claim 1 wherein the propulsion drive shaft turns a sun gear to engage a plurality of planet gears.

4. The steering mechanism of claim 1 further comprising a steering position encoder operably connected to the steering tube to provide the steering position to a controller.

5. The steering mechanism of claim 1 further comprising a tire mounted on the wheel, the tire having a rolling radius, the ratio of the rolling radius to the scrub radius being within ten percent of the gear reduction ratio from the propulsion drive motor to the wheel.

6. The steering mechanism of claim 1 wherein the self-propelled vehicle is riderless.

7. A steering mechanism for a wheel of a self-propelled vehicle comprising:
   a wheel spindle on which the wheel is rotatably mounted;
   a steering motor turning a steering tube defining a generally vertical steer axis;
   a propulsion drive motor turning a propulsion drive shaft extending through the steering tube;
   a gearbox between the propulsion drive motor and the propulsion drive shaft, having a plurality of gears providing a gear reduction ratio;
   the wheel being offset from the steer axis and rotating on the wheel spindle without skidding as the steering motor turns the steering tube while the propulsion drive shaft is stationary.

8. The steering mechanism of claim 7 further comprising a tire mounted on the wheel and defining a scrub radius between the tire and the steer axis; the tire having a rolling radius; the ratio of the rolling radius to the scrub radius being within about ten percent of the gear reduction ratio between the propulsion drive motor and the wheel.

9. The steering mechanism of claim 7 wherein the plurality of gears include a sun gear mounted to the propulsion drive shaft and a plurality of planet gears, wherein the propulsion drive shaft turns the sun gear to engage the plurality of planet gears.

10. The steering mechanism of claim 7 wherein the self-propelled vehicle is riderless.

11. The steering mechanism of claim 7 wherein the propulsion drive motor and steering motor are above the wheel.

12. The steering mechanism of claim 7 further comprising a scrub radius between the vertical steer axis and the wheel.

13. The steering mechanism of claim 7 further comprising a steering position encoder operably detecting the position of the steering tube.

14. A steering mechanism for a self-propelled vehicle comprising:
   a wheel mounted on a spindle, the wheel having a rolling radius;
   an electric steering motor and an electric propulsion drive motor for the wheel, wherein the electric steering motor turns a steering tube defining a generally vertical steer axis; a first shaft between the motors and the wheel spindle and defining a generally vertical steer axis;
   the wheel being offset from the steer axis to define a scrub radius;
   a gearbox between the propulsion drive motor and the wheel, having a plurality of gears providing a gear reduction ratio that is within ten percent of the ratio between the rolling radius and the scrub radius of the wheel, wherein the plurality of gears comprises a sun gear to engage with and to rotate a plurality of planet gears.

15. The steering mechanism of claim 14 wherein the self-propelled vehicle is riderless.

16. The steering mechanism of claim 14 further comprising a steering position encoder.

17. The steering mechanism of claim 14 further comprising a propulsion drive shaft concentric with the steering tube.

18. The steering mechanism of claim 14 wherein the wheel is cambered.

19. The steering mechanism of claim 14 wherein the self-propelled vehicle has a plurality of wheels mounted on spindles, and an electric propulsion drive motor and an electric steering motor for each wheel.

* * * * *